(12) United States Patent
Jones et al.

(10) Patent No.: US 8,450,677 B2
(45) Date of Patent: May 28, 2013

(54) METHODS AND SYSTEMS FOR CONTROLLING A REFLECTANCE OF MIRROR IN A VEHICLE

(75) Inventors: Nigel G. Jones, Orion, MI (US); Nicholas P. Nagrant, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 421 days.

(21) Appl. No.: 12/772,844

(22) Filed: May 3, 2010

(65) Prior Publication Data
US 2011/0266419 A1  Nov. 3, 2011

(51) Int. Cl.
*H01J 40/14* (2006.01)
*G01J 1/44* (2006.01)

(52) U.S. Cl.
USPC ............. 250/214 AL; 250/214 C; 250/214 R; 359/603

(58) Field of Classification Search
USPC ..... 250/214 AL, 214 C, 214 R, 205; 359/604
See application file for complete search history.

(56) References Cited

U.S. PATENT DOCUMENTS

| 3,601,614 | A  | * | 8/1971  | Platzer ................... 250/214 AL |
| 4,793,690 | A  | * | 12/1988 | Gahan et al. ................. 359/604 |
| 7,572,017 | B2 | * | 8/2009  | Varaprasad et al. .......... 359/603 |
| 7,728,276 | B2 | * | 6/2010  | Drummond et al. .... 250/214 AL |

* cited by examiner

*Primary Examiner* — Tony Ko
(74) *Attorney, Agent, or Firm* — Ingrassia Fisher & Lorenz, P.C.

(57) ABSTRACT

Methods and systems are provided for adjusting a reflectance of a mirror of a vehicle. A first sensor measures an ambient light condition outside the vehicle. A second sensor measures a glare from the mirror. A controller identifies a characteristic of the vehicle, and adjusts the reflectance of the mirror based on the characteristic, the ambient light condition, and the glare.

19 Claims, 2 Drawing Sheets

METHODS AND SYSTEMS FOR CONTROLLING A REFLECTANCE OF MIRROR IN A VEHICLE

TECHNICAL FIELD

The present invention generally relates to the field of a vehicle and, more specifically, to methods and systems for controlling a reflectance of at least one mirror in a vehicle.

BACKGROUND

Many automobiles today include auto-dimming mirrors, for example for an inside rear view mirror, a driver side outside rear view mirror, and/or a passenger side outside rear-view mirror. Such auto-dimming mirrors typically have a surface that is darkened in response to glare in a manner that attempts to optimize the darkening of the surface in order to meet the expectations of the majority of the population. However, some individuals may have different preferences for mirror surface darkening. For example, certain individuals may have a preference for relatively more darkening of the mirror surface as compared with the majority of the population, while certain other individuals may have a preference for relatively less darkening of the mirror surface as compared with the majority of the population. Some individuals may also have different preferences for mirror surface darkening depending on the type of vehicle that they are operating.

Accordingly, it is desirable to provide an improved method and system for controlling reflectance of mirrors in vehicles in a manner that is customized to a particular vehicle and/or to a particular driver of the vehicle. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for adjusting a reflectance of a mirror of a vehicle is provided. The method comprises the steps of identifying a characteristic of the vehicle, determining an ambient light condition outside the vehicle, determining a glare from the mirror, and adjusting the reflectance of the mirror based on the characteristic, the ambient light condition, and the glare.

In accordance with another exemplary embodiment, a system for adjusting a reflectance of a mirror of a vehicle is provided. The system comprises a first sensor, a second sensor, and a controller. The first sensor is configured to measure an ambient light condition outside the vehicle. The second sensor is configured to measure a glare from the mirror. The controller is coupled to the first sensor and the second sensor. The controller is configured to identify a characteristic of the vehicle, and to adjust the reflectance of the mirror based on the characteristic, the ambient light condition, and the glare.

In accordance with a further exemplary embodiment, a mirror assembly for a vehicle is provided. The mirror assembly comprises a mirror, a first sensor, a second sensor, an input device, and a controller. The mirror has an adjustable reflectance. The first sensor is configured to measure an ambient light condition outside the vehicle. The second sensor is configured to measure a glare from the mirror. The input device is configured to receive an input. The controller is coupled to the first sensor, the second sensor, the input device, and the mirror. The controller is configured to identify a characteristic of the vehicle using the input, select a relationship relating the reflectance, the glare, and the ambient light condition based on the characteristic, determine an optimal reflectance based on the relationship using the glare and the ambient light condition as variable inputs, and adjust a voltage provided to the mirror in an amount that adjusts the reflectance of the mirror to equal the optimal reflectance. In one embodiment, this process flow can repeat itself at various points. For example, in one exemplary embodiment, once the process completes the entire cycle through step 316, the process repeats back to step 310 to continuously measure/adjust to ambient light and glare, and steps 306-316 repeat accordingly in new iterations, if there are no changes to the vehicle characteristic settings.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit application and uses.

Figure 1:
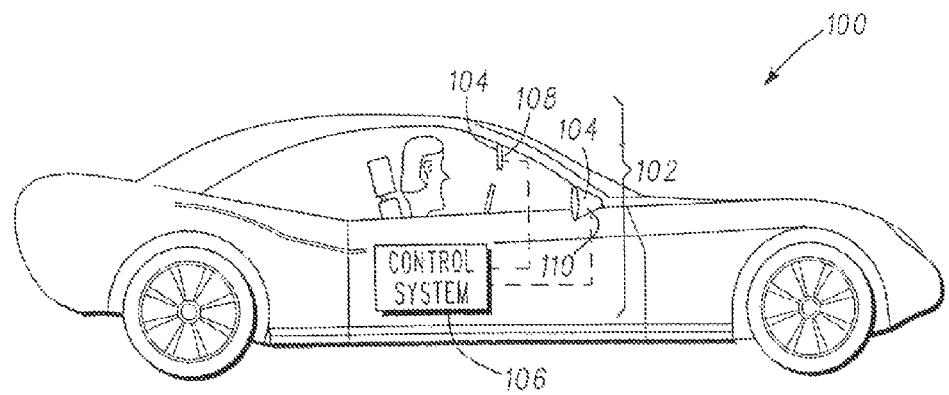
FIG. 1 is a functional block diagram of a vehicle having a mirror assembly including an inside rear view mirror, outside rear view mirrors, and a control system for controlling the reflectance of the mirrors, in accordance with an exemplary embodiment.

FIG. 1 is a block diagram of an exemplary vehicle 100 having a mirror assembly 102. In one preferred embodiment, the vehicle comprises an automobile, such as a sedan, a sport utility vehicle, a van, or a truck. However, the type of vehicle may vary in different embodiments.

As depicted in FIG. 1, the mirror assembly 102 includes mirrors 104 and a control system 106. Also in the depicted embodiment, the mirrors 104 include an inside rear view mirror 108 and one or more outside rear view mirrors 110. The inside rear view mirror 108 is disposed inside the vehicle 100, preferably above a dashboard of the vehicle 100. The outside rear view mirrors 110 are disposed outside the vehicle 100, preferably on both a driver's side and a passenger's side of the vehicle 100. In one exemplary embodiment, each of the mirrors 104 is made from an electrochromic glass.

The control system 106 determines and implements customized reflectance values for darkening of mirror surfaces based on preferences of the driver and/or other characteristics of the driver and/or the vehicle. Specifically, the control system 106 controls the reflectance of a surface of the mirrors 104 based on ambient light conditions surrounding the vehicle, an amount of glare from the mirror, and at least one characteristic that is customized for the particular vehicle 100 and/or a particular driver or operator of the vehicle 100, as described in greater detail below in connection with FIGS. 2 and 3.

As used throughout this application, a "characteristic" or "characteristic of the vehicle" encompasses any characteristic of the vehicle and/or of any drivers or other passengers therein, such as those described herein. For example, the terms "characteristics" or "characteristic of the vehicle" as used throughout this application shall refer to both vehicle characteristics and driver characteristics as referenced in the Figures and in the Specification of this Application.

Figure 2:
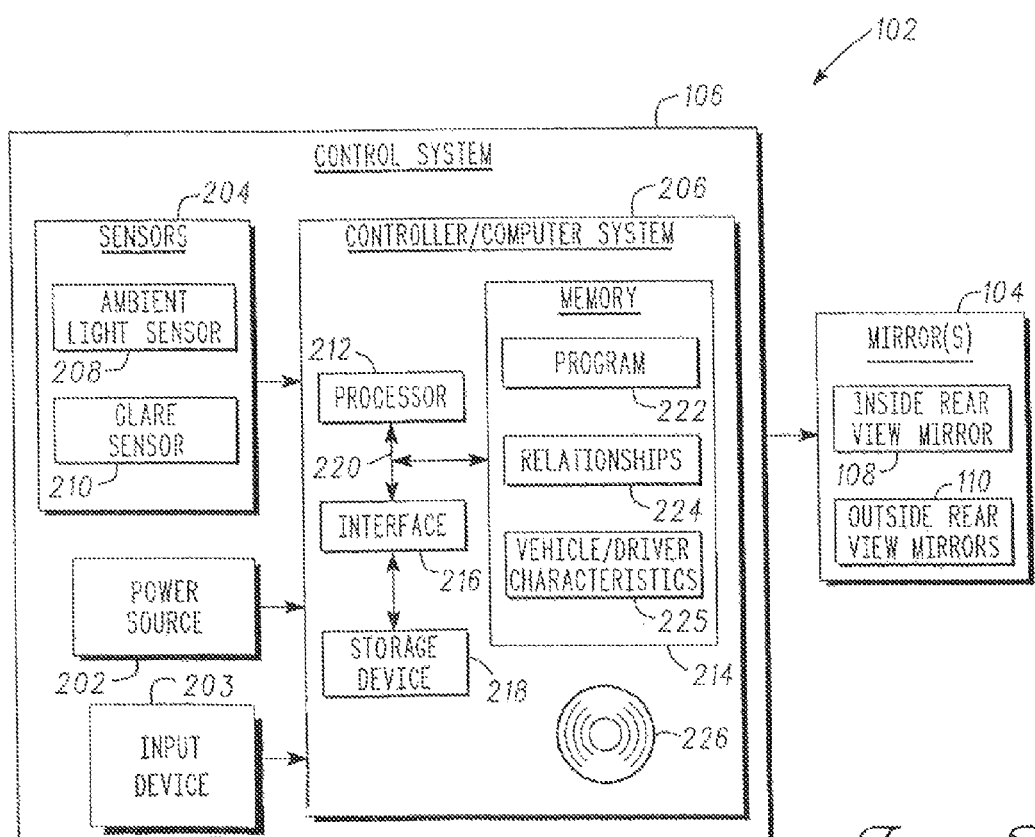
FIG. 2 is a functional block diagram of the mirror assembly of FIG. 1, in accordance with an exemplary embodiment.

FIG. 2 is a functional block diagram of the mirror assembly 102 of FIG. 1, in accordance with an exemplary embodiment. In the depicted embodiment, the control system 106 is coupled to each of the mirrors 104, including the inside rear view mirror 108 and each of the outside rear view mirrors 110. However, in certain embodiments, the control system 106 may be coupled to some mirrors 104 and not others, or may be located remotely elsewhere in the vehicle and communicate to the mirrors.

Also in the depicted embodiment, the control system 106 includes a power source 202, an input device 203, sensors 204, and a controller 206. The power source 202 provides voltage for the mirrors 104. In one exemplary embodiment, the power source 202 comprises a twelve volt battery. However, this may vary in other embodiments. For example, in certain embodiments, an alternator-driven electrical system may be utilized during vehicle operation, among other possible variations.

The input device 203 receives information as to one or more characteristics that may be relevant in determining the optimal reflectance for the mirrors 104 under various conditions. The characteristics may include, among other possible characteristics, the type of vehicle (for example, the make, model, and/or year of the vehicle, and/or a size or category of vehicle, such as a truck, sport utility vehicle, compact car, sedan, and the like), an amount of window tinting on the vehicle (for example, on the rear window of the vehicle), the identity of the driver (for example, if different drivers operate the same vehicle at different times), a measure of sensitivity of the driver's eyes to light, and/or a driver's expressed preferences as to desired amounts of mirror reflectance.

In certain embodiments, the input device 203 receives inputs as to the characteristics from a driver or operator of the vehicle. In one such embodiment, the input device 203 comprises a dial or switch disposed on the inside rear view mirror 108 of the vehicle 100. In another embodiment, the input device 203 comprises a dial or switch on another mirror 104 of the vehicle 100. In another embodiment, the input device 203 comprises a dial or a switch on a dashboard of the vehicle 100. In other embodiments, the input device 203 comprises an interface with a display screen of the vehicle 100, for example of a navigational system of the vehicle 100. In yet other embodiments, the input device 203 receives inputs as to the characteristics from a vehicle manufacturer, dealer, and/or service center, for example via a wired connection, a telematics system, and/or a wireless receiver.

In the depicted embodiment, the sensors 204 include at least one ambient light sensor 208 and at least one glare sensor 210. The ambient light sensor 208 measures ambient light conditions outside the vehicle (for example, a measure of brightness/darkness outside the vehicle) and provides signals or information pertaining thereto to the controller 206 for processing. The glare sensor 210 measures an amount of glare from the mirrors (preferably, measured as an amount of glare at a surface of the inside rear view mirror 108 facing the driver and/or at a surface of the outside rear view mirrors 110) and provides signals or information pertaining thereto to the controller 206 for processing.

In one embodiment, the ambient light sensor 208 and the glare sensor 210 are both disposed on or within the inside rear view mirror 108, but on opposite sides thereof. Specifically, in one embodiment, the ambient light sensor 208 is disposed on a first side of the inside rear view mirror 108 facing a front window of the vehicle, and measures ambient light conditions outside the front of the vehicle. Also in this embodiment, the glare sensor 210 is disposed on an opposite side of the inside rear view mirror 108 facing a rear window of the vehicle, and measures an amount of glare received from the surface of the inside rear view mirror 108 from the rear window.

The placement of one or more of the sensors 204 may vary in other embodiments. For example, in certain embodiments, a separate glare sensor 210 may be disposed on or near a different mirror 104 of the vehicle 100 in order to obtain separate glare values for each mirror 104, for use in calculating separate optimal reflectance values for each mirror 104. In another exemplary embodiment, the glare sensor 210 may be placed in or proximate only one of the mirrors 104 as a "master", and may direct the auto-dimming of the other mirrors 104 as a "slave". In another exemplary embodiment, the ambient light sensor 208 may be located elsewhere in the vehicle, and/or may be a shared sensor with other vehicle systems (such as, by way of example only, a day/night sensor to activate auto headlights on/off, an ambient light sensor for advanced safety systems such as "Lane Departure Warning", "Traffic Sign Recognition", "Auto Hi-Beams", and the like).

Similarly, the references throughout this application to a determination of glare "from" a mirror preferably refers to one or more of the following: (i) measuring the glare at or near a surface of such mirror; (ii) approximating the glare from such mirror based on one or more similar measurements at or near a surface of another mirror of the vehicle and/or at one or more other locations of the vehicle; and/or (iii) receiving and/or processing a glare value and/or information pertaining thereto from one or more other sensors, modules, systems, devices, and/or sources.

The controller 206 receives signals and information from the input device 203 regarding the characteristics of the vehicle and/or the driver, and processes this information. In addition, the controller 206 receives signals and information from the sensors 204 as to the ambient light conditions outside the vehicle and the amount of glare from (preferably, at a surface of) the inside rear view mirror 108 and/or another mirror of the vehicle, and also processes this information. The controller 206 controls the reflectance of the surfaces of the mirrors 104 based on the ambient light conditions outside the vehicle, the amount of glare from (preferably at a surface of) one or more of the mirrors of the vehicle, and the characteristics of the vehicle and/or the driver. In a preferred embodiment, the controller 206 controls an amount of voltage supplied to the mirrors 104 by the power source 202 in order to adjust the reflectance of the mirrors 104 based on the ambient light conditions and glare in a manner that is also customized to the specific vehicle and/or driver thereof.

As depicted in FIG. 2, the controller 206 preferably comprises a computer system. In one embodiment, the controller 206 is disposed within the inside rear view mirror 108 of the vehicle. In other embodiments, the controller 206 may be disposed within another mirror 104 of the vehicle, within one or more existing computer systems and/or other modules of the vehicle, and/or elsewhere within the vehicle.

The controller 206 or computer system includes, but is not limited to a processor 212, a memory 214, an interface 216, a storage device 218, and a bus 220. The processor 212 performs the computation and control functions of the controller 206 and the control system 106, and may comprise any type of processor or multiple processors, single integrated circuits such as a microprocessor, or any suitable number of integrated circuit devices and/or circuit boards working in cooperation to accomplish the functions of a processing unit. During operation, the processor 212 executes one or more programs 222 contained within the memory 214 and, as such, controls the general operation of the control system 106 and the controller 206, preferably in executing the steps of the processes described herein, such as the process 300 depicted in FIG. 3 and described further below in connection therewith.

The memory 214 can be any type of suitable memory. This would include the various types of dynamic random access memory (DRAM) such as SDRAM, the various types of static RAM (SRAM), and the various types of non-volatile memory (PROM, EPROM, and flash). The bus 220 serves to transmit programs, data, status and other information or signals between the various components of the controller 206. In a preferred embodiment, the memory 214 stores the above-referenced program 222 along with one or more relationships 224 and driver/vehicle characteristics 225 that are used in determining an optimal reflectance for the mirrors 104 of the vehicle 100 under various conditions. In certain embodiments, hardwired communications may be utilized instead of or in addition to the bus 220.

The interface 216 allows communication to the controller 206, for example from a system driver and/or another computer system, and can be implemented using any suitable method and apparatus. It can include one or more network interfaces to communicate with other systems or components. The interface 216 may also include one or more network interfaces to communicate with technicians, and/or one or more storage interfaces to connect to storage apparatuses, such as the storage device 218.

The storage device 218 can be any suitable type of storage apparatus, including direct access storage devices such as hard disk drives, flash systems, floppy disk drives and optical disk drives. In one exemplary embodiment, the storage device 218 comprises a program product from which memory 214 can receive a program 222 that executes one or more embodiments of one or more processes, such as the process 300 of FIG. 3 or portions thereof. In another exemplary embodiment, the program product may be directly stored in and/or otherwise accessed by the memory 214 and/or a disk (e.g., disk 226) such as that referenced below.

The bus 220 can be any suitable physical or logical means of connecting computer systems and components. This includes, but is not limited to, direct hard-wired connections, fiber optics, infrared and wireless bus technologies. During operation, the program 222 is stored in the memory 214 and executed by the processor 212.

It will be appreciated that while this exemplary embodiment is described in the context of a fully functioning computer system, those skilled in the art will recognize that the mechanisms of the present disclosure are capable of being distributed as a program product in a variety of forms, and that the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the controller 206 may also otherwise differ from the embodiment depicted in FIG. 2, for example in that the controller 206 may be coupled to or may otherwise utilize one or more remote computer systems and/or other control systems.

Figure 3:
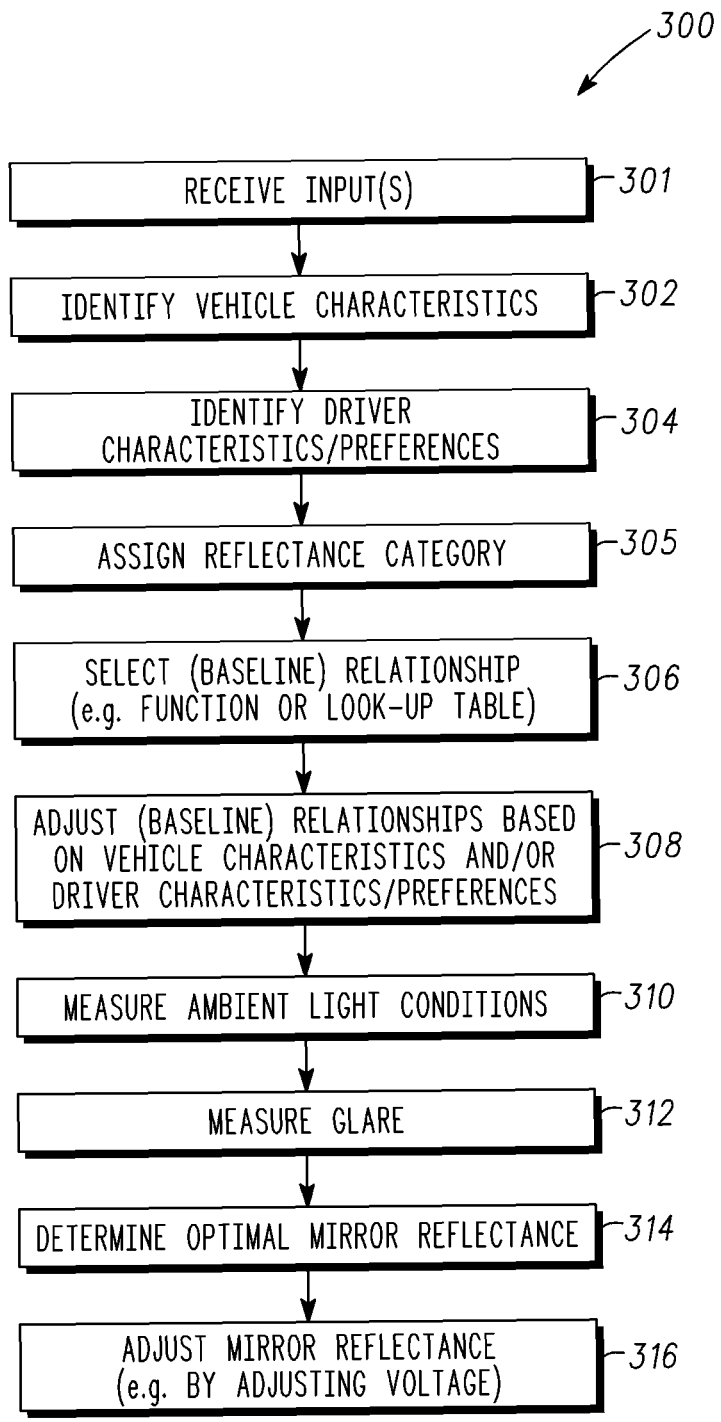
FIG. 3 is a flowchart of a process for controlling reflectance in one or more mirrors of a vehicle, and that can be utilized in connection with the vehicle of FIG. 1 and the mirror assembly of FIGS. 1 and 2, in accordance with an exemplary embodiment.

FIG. 3 is a flowchart of a process 300 for controlling reflectance in one or more mirrors of a vehicle, in accordance with an exemplary embodiment. The process 300 determines and implements customized reflectance values for darkening of mirror surfaces based on preferences of the driver and/or other characteristics of the driver and/or the vehicle. The process 300 can be utilized in connection with the vehicle 100 of FIG. 1 and the mirror assembly 102 of FIGS. 1 and 2, including the mirrors 104 and the control system 106 thereof, also in accordance with an exemplary embodiment.

As depicted in FIG. 3, the process 300 begins with the step of receiving one or more inputs (step 301). In a preferred embodiment, the inputs include information pertaining to one or more characteristics of the vehicle (such as the vehicle 100 of FIG. 1) and/or an operator of the vehicle. Also in a preferred embodiment, the inputs are received via the input device 203 of FIG. 2. In certain embodiments, the inputs are received via the input device 203 from a driver or operator of the vehicle, for example via a mechanical switch, dial, and/or display screen interface of the vehicle. In certain other embodiments, the inputs are received via the input device 203 of FIG. 2 from a vehicle manufacturer, dealer, and/or service center, for example via a wired connection, a telematics system, or a wireless receiver.

In certain embodiments, the inputs are received as the vehicle is manufactured. In other embodiments, the inputs are received at subsequent points in time, for example, when new information about the vehicle and/or the driver becomes available and/or whenever the driver wishes to establish or change preferences as to a desired reflectance for the mirrors. The inputs are preferably provided by the input device 203 of FIG. 2 to the processor 212 of FIG. 2 for processing.

One or more vehicle characteristics pertaining to the type of vehicle are then identified (step 302). The vehicle characteristics identified in step 302 are characteristics of the vehicle that have relevance in determining an optimal reflectance for the mirrors under various conditions for this particular vehicle, and in determining how the optimal reflectance may vary from a typical or baseline vehicle representing a majority of or an average value pertaining to the vehicle population. The vehicle characteristics may include the type of vehicle (for example, the make, model, and/or year of the vehicle, and/or a category of vehicle, such as a truck, sport utility vehicle, compact car, sedan, and the like), an amount of window tinting on the vehicle (for example, on the rear window of the vehicle), and/or other characteristics of the vehicle that may be relevant in determining the optimal reflectance of the mirrors.

In the depicted embodiment, one or more driver characteristics pertaining to the driver of the vehicle are also identified (step 304). The driver characteristics identified in step 304 are characteristics of the driver that have relevance in determining an optimal reflectance for the mirrors under various conditions for this particular driver, and in determining how the optimal reflectance may vary from a typical or baseline driver and/or representing a majority of or an average value pertaining to the population of drivers. The driver characteristics may include the identity of the driver (for example, if different drivers operate the same vehicle at different times), a measure of sensitivity of the driver's eyes to light (for example, using a retina scanner as one of the sensors 204 of FIG. 1 or a pre-programmed measure of sensitivity for particular drivers stored in the memory 214 of FIG. 1), and/or a driver's expressed preferences as to desired amounts of mirror reflectance, among other possible driver characteristics that may be relevant in determining the optimal reflectance of the mirrors (which may be stored in the memory 214 of FIG. 1). In certain embodiments in which multiple drivers operate the same vehicle, the characteristics for each driver may be stored in the memory 214 of FIG. 2 and subsequently retrieved along with a determination of which driver is presently operating the vehicle (for example, such a determination may be made by the driver identifying oneself via the input device 203, and/or the vehicle may ascertain biometric or other information to determine the driver's identify without additional active inputs from the driver under certain circumstances).

In a preferred embodiment, the vehicle characteristics and the driver characteristics are identified in steps 302 and 304, respectively, by the processor 212 of FIG. 2 based on the inputs received from the input device 203 of FIG. 2 in step 301, and are stored in the memory 214 of FIG. 2 as stored vehicle/driver characteristics 225 of FIG. 2. In one preferred embodiment, the vehicle and driver characteristics are identified in steps 302 and 304, respectively, whenever new inputs pertaining to the driver are obtained. While FIG. 3 depicts the identification of both vehicle characteristics (step 302) and driver characteristics (step 304), in certain embodiments and/or circumstances vehicle characteristics may be identified without the identification of driver characteristics, or vice versa.

In certain embodiments, a reflectance category is assigned for the vehicle and/or the driver based on the vehicle characteristics of step 302 and/or the driver characteristics of step 304 (step 305). In a preferred embodiment, during step 305 the reflectance category of the vehicle and/or the driver is determined and assigned in this manner by the processor 212 of FIG. 2.

In one embodiment, the assigned reflectance category is selected from one of a number of possible categories (for example, default or average reflectance, high reflectance, low reflectance, and the like) that correspond to a relative importance of reducing glare from the mirrors on the one hand versus maintaining mirror images that are not overly dark on the other hand. For example, a driver having eyes with average light sensitivities and preferences who is driving an average-sized car with average rear window tinting may be placed in a default or average reflectance category.

By way of further example, a vehicle and/or driver may instead be categorized into a low reflectance category if one or more of the following criteria is satisfied: (i) the driver has eyes that are more sensitive to light than an average driver, (ii) the driver has a stated preference for lower than average glare during night driving as compared with an average driver, (iii) the vehicle is smaller than average, is lower to the ground than average, or has a less than average distance between the inside rear view mirror and the rear window, and/or (iv) the vehicle has lighter than average tinting on the rear view mirror, and so on. Conversely, a vehicle and/or driver may instead be categorized into a high reflectance category if one of more of the following criteria is satisfied: (i) the driver has eyes that are less sensitive to light than an average driver, (ii) the driver has a stated preference for viewing lighter images in the mirror at during night driving as compared with an average driver, (iii) the vehicle is larger than average, is higher from the ground than average, has tall rear seats that block glare from the rear window, or has a greater than average distance between the inside rear view mirror and the rear window than average, and/or (iv) the vehicle has heavier than average tinting on the rear view mirror, and so on. Various other gradations and/or levels of categories may also be utilized.

A relationship is then selected for use in determining the optimal reflectance of the vehicle (step 306). In a preferred embodiment, the relationship relates the ambient light conditions outside the vehicle and the glare from one or more mirrors of the vehicle (preferably as determined by the sensors 204 of FIG. 2 as described above) as independent or input variables with an optimal reflectance for the windows as a dependent or output variable.

In a preferred embodiment, during step 306 the relationship is selected by the processor 212 of FIG. 2 from one or more possible relationships 224 stored in the memory 214 of FIG. 2. In certain embodiments, the relationship comprises a look-up table by which an optimal reflectance of the mirrors is determined based on the ambient light conditions outside the vehicle and the glare from the mirror. In other embodiments, the relationship includes a function or curve by which an optimal reflectance of the mirrors is determined based on the ambient light conditions outside the vehicle and the glare from the mirror.

In one embodiment, the relationship selected in step 306 is a baseline relationship that is selected to satisfy the needs and preferences for a majority of the population of vehicles and/or drivers, and is selected irrespective of the vehicle characteristics and the driver characteristics selected in steps 302 and 304, respectively, and irrespective of the reflectance category determined in step 305. In such embodiments, the baseline relationship is subsequently adjusted in step 308 based on the vehicle characteristics of step 302 and/or the driver characteristics of step 304, as described in greater detail further below in connection with step 308.

In another embodiment, a customized relationship is selected in step 306 based on the vehicle characteristics and/or the driver characteristics identified in steps 302 and 304, respectively. For example, in one such embodiment, the customized relationship is selected in step 306 based on the particular reflectance category of the vehicle and/or the driver as determined from the vehicle characteristics and/or the driver characteristics in step 305, and no further adjustment is necessary. Accordingly, in such embodiments, the process may skip step 308 (described below).

As referenced earlier, in certain embodiments, the relationship selected in step 306 is adjusted (step 308). Specifically, in certain embodiments in which a baseline relationship is selected in step 306, the baseline relationship is then adjusted in step 308 based on the vehicle characteristics and/or driver characteristics identified in steps 302 and 304, respectively. For example, in one such embodiment, the relationship is adjusted in step 308 based on the particular reflectance category of the vehicle and/or the driver as determined from the vehicle characteristics and/or the driver characteristics in step 305. The adjustment of the relationship, if any, in step 308 is preferably performed by the processor 212 of FIG. 2.

In certain embodiments, in step 308 the processor 212 of FIG. 2 adjusts one or more intercepts of the relationship, such as one or more intercepts of a baseline function or curve (or a substantially equivalent adjustment to a baseline look-up table) from step 306. In such embodiments, the adjustment of the one or more intercepts would have an effect of adjusting an ambient light threshold and/or a glare threshold in which darkening of the mirror commences (as compared with baseline values representing a majority or an average value of the population) and/or establishing a new minimum and/or maximum value for the reflectance of the mirrors (as compared with baseline values representing a majority or an average value of the population).

In certain other embodiments, in step 308 the processor 212 of FIG. 2 shifts, or adjusts a slope, of the relationship, such as a baseline function or curve (or a substantially equivalent adjustment to a baseline look-up table) from step 306. In such an embodiment, the shift or change in the slope of the relationship would have an effect of adjusting mirror reflectance values between the minimum and maximum reflectance values (as compared with baseline values representing a majority or an average value of the population). In yet other embodiments, the processor 212 of FIG. 2 simultaneously adjusts the slop and one or more intercepts of the relationship.

In addition, ambient light conditions are measured (step 310). In a preferred embodiment, during step 310, the ambient light sensor 208 of FIG. 2 measures ambient light conditions directly outside the vehicle, and provides signals or information pertaining thereto to the processor 212 of FIG. 2 for processing and for use in determining the optimal reflectance for the mirrors.

A glare is also measured, determined, and/or ascertained (step 312). In a preferred embodiment, during step 312, the glare sensor 210 of FIG. 2 measures an amount of glare as experienced directly on the mirror's reflective surface (most preferably for each of the mirrors in 104), and provides signals or information pertaining thereto to the processor 212 of FIG. 2 for processing and for use in determining the optimal reflectance for the mirrors. In certain other embodiments, the glare from the mirror may be approximated based on one or more similar measurements at or near a surface of another mirror of the vehicle and/or at one or more other locations of the vehicle. In yet other embodiments, the glare from the mirror may be determined by receiving and/or processing a glare value and/or information pertaining thereto from one or more other sensors, modules, systems, devices, and/or sources.

An optimal reflectance for the mirrors is then determined (step 314). Specifically, in a preferred embodiment, the processor 212 of FIG. 2 determines the optimal reflectance of the mirror surfaces using the customized relationship of step 306 or step 308. If a baseline relationship was selected in step 306 and then adjusted in step 308 based on the vehicle and/or driver characteristics of steps 302, 304 (and/or the particular reflectance category of determined in step 305), then the adjusted relationship from step 308 is used as the customized relationship in step 314. Conversely, if a relationship was already selected in step 306 based on the vehicle and/or driver characteristics of steps 302, 304 (and/or the particular reflectance category determined in step 305) and was not adjusted in step 308, then the relationship selected in step 306 is used as the customized relationship in step 314.

Also in a preferred embodiment, during step 314 the processor 212 of FIG. 2 uses the ambient light conditions measured in step 310 and the glare from step 312 as independent or input variables into the customized relationship (for example, a function, curve, or look-up table, as described above), and then obtains a desired reflectance for the mirror surfaces as a dependent or output variable from the customized relationship. The resulting optimized reflectance for the mirrors is thus customized or tailored to the particular vehicle and/or driver via the selection of step 306 and/or the adjustment of step 308 used to generate the customized relationship. In certain embodiments, a single value of optimal reflectance is determined for the surface of each mirror of the vehicle. In certain other embodiments, different values of optimal reflectance are determined separately for the surfaces of each mirror of the vehicle, for example based on separate glare values measured individually at the surfaces of each mirror.

The mirror reflectance is then adjusted (step 316). In a preferred embodiment, the reflectance of the surface of the mirrors is adjusted during step 316 so that the adjusted reflectance of the mirror surfaces is equal to the optimal reflectance value determined in step 314. Also in a preferred embodiment, the reflectance of the mirrors is adjusted in step 316 by the processor 212 of FIG. 2 by adjusting the voltage provided by the power source 202 of FIG. 2 to the mirrors 104 of FIGS. 1 and 2.

Specifically, in one embodiment, if a present or current reflectance of the mirror is greater than the optimal reflectance as determined in step 314 (for example, if the glare from the mirror 104 is larger than optimal for the particular vehicle and/or driver), then the processor 212 of FIG. 2 increases voltage from the power source 202 until the reflectance of the mirror 104 is reduced to the optimal level determined in step 314. Conversely, if a present or current reflectance of the mirror 104 is less than the optimal reflectance as determined in step 314 (for example, if images in the mirror 104 are darker than optimal for the particular vehicle and/or driver), then the processor 212 of FIG. 2 decreases voltage from the power source 202 until the reflectance of the mirror 104 is increased to the optimal level determined in step 314.

Accordingly, improved methods and systems are provided for controlling reflectance in vehicle mirrors. The improved methods and systems provide for flexibility in determining and adjusting reflectance of mirror surfaces and in customizing the reflectance to meet the specific preferences of the driver and/or other characteristics of the driver and/or the vehicle. For example, if a particular driver has eyes that are more sensitive to light than an average driver (or, for example, if the driver has a preference for lower glare and/or is driving a vehicle for which glare might otherwise be larger as compared with a vehicle having typical or average characteristics among a population of vehicles), then the methods and systems disclosed herein allow for a function, curve, look-up table, or other relationship to be adjusted in order to reduce reflectance of the mirror, to thereby reduce glare accordingly under appropriate conditions and circumstances. Conversely, if a particular driver has eyes that are less sensitive to light than an average driver (or, for example, if the driver has a greater than average preference for viewing lighter images in the mirror at night and/or is driving a vehicle for which glare might otherwise be less as compared with a vehicle having typical or average characteristics among a population of vehicles), then the methods and systems disclosed herein allow for a function, curve, look-up table, or other relationship to be adjusted in order to increase reflectance of the mirror, to thereby increase glare accordingly under appropriate conditions and circumstances.

It will be appreciated that the disclosed methods and systems may vary from those depicted in the Figures and described herein. For example, as mentioned above, certain components of the control system 106 of FIGS. 1 and 2 (such as the sensors 204) may vary in type, number, and/or placement. Similarly, the control system 106 may be disposed in whole or in part in any one or more of a number of different vehicle units, devices, and/or systems, among other possible variations. In addition, certain steps of the process 300 may vary from those depicted in FIG. 3 and/or described herein in connection therewith. For example, as discussed above, in certain embodiments, step 302 may be conducted without step 304, or vice versa, and/or step 306 may be conducted without step 308. It will similarly be appreciated that various steps of the process 300 may occur simultaneously or in a different order than that depicted in FIG. 3 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles, and in controlling any one or more of a number of different types of vehicle infotainment systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for adjusting a reflectance of a mirror of a vehicle, the method comprising the steps of:
   identifying a characteristic of the vehicle;
   determining an ambient light condition outside the vehicle;
   determining a glare from the mirror;
   obtaining a baseline relationship relating the reflectance, the glare, and the ambient light condition;
   adjusting the baseline relationship based on the characteristic to create an adjusted relationship;
   determining an optimal reflectance based on the adjusted relationship using the glare and the ambient light condition as variable inputs; and
   adjusting the reflectance of the mirror by adjusting a voltage provided to the mirror in an amount that adjusts the reflectance of the mirror to equal the optimal reflectance.

2. The method of claim 1, wherein the characteristic comprises characteristic of a driver of the vehicle.

3. The method of claim 1, wherein the vehicle includes a rear window, and the characteristic comprises a tinting on the rear window.

4. The method of claim 1, wherein the step of identifying the characteristic comprises the steps of:
   obtaining an input from a driver of the vehicle; and
   identifying the characteristic using the input.

5. The method of claim 4, wherein the characteristic comprises a driver preference for an amount of reflectance of the mirror as reflected in the input from the driver.

6. The method of claim 1, wherein the adjusted relationship comprises a function.

7. The method of claim 1, wherein:
   the baseline relationship includes a slope; and
   the step of adjusting the baseline relationship comprises the step of adjusting the slope.

8. A system for adjusting a reflectance of a mirror of a vehicle, the system comprising:
   a first sensor configured to measure an ambient light condition outside the vehicle;
   a second sensor configured to measure a glare from the mirror; and
   a processor coupled to the first sensor and the second sensor and configured to:
      identify a characteristic of the vehicle;
      obtain a baseline relationship relating the reflectance, the glare, and the ambient light condition;
      adjust the baseline relationship based on the characteristic to create an adjusted relationship;
      determine an optimal reflectance based on the adjusted relationship using the glare and the ambient light condition as variable inputs; and
      adjust the reflectance of the mirror by adjusting a voltage provided to the mirror in an amount that adjusts the reflectance of the mirror to equal the optimal reflectance.

9. The system of claim 8, wherein the characteristic comprises a characteristic of a driver of the vehicle.

10. The system of claim 8, wherein the vehicle includes a rear window, and the characteristic comprises a tinting on the rear window.

11. The system of claim 8, further comprising:
    an input device coupled to the processor and configured to receive an input from a driver of the vehicle, wherein the processor is configured to identify the characteristic using the input.

12. The system of claim 11, wherein the characteristic comprises a driver preference for an amount of reflectance of the mirror as reflected in the input from the driver.

13. The system of claim 8, wherein the relationship comprises a function.

14. The system of claim 8, wherein:
    the baseline relationship includes a slope; and
    the processor is configured to adjust the baseline relationship by adjusting the slope.

15. A mirror assembly for a vehicle, the mirror assembly comprising:
    a mirror having an adjustable reflectance;
    a first sensor configured to measure an ambient light condition outside the vehicle;
    a second sensor configured to measure a glare from the mirror;
    an input device configured to receive an input; and
    a processor coupled to the first sensor, the second sensor, the input device, and the mirror, the processor configured to:
       identify a characteristic of a driver of the vehicle using the input;
       select a relationship relating the reflectance, the glare, and the ambient light condition, based on the characteristic;
       determine an optimal reflectance based on the relationship using the glare and the ambient light condition as variable inputs; and
       adjust a voltage provided to the mirror in an amount that adjusts the reflectance of the mirror to equal the optimal reflectance.

16. The mirror assembly of claim 15, wherein the characteristic comprises a preference of the driver pertaining to the mirror.

17. The mirror assembly of claim 15, wherein the processor is further configured to:
    obtain a baseline relationship relating the reflectance, the glare, and the ambient light condition;
    adjust the baseline relationship based on the characteristic to create an adjusted relationship; and
    determine the optimal reflectance based on the adjusted relationship using the glare and the ambient light condition as variable inputs.

18. The mirror assembly of claim 17, wherein:
    the baseline relationship includes a slope; and
    the processor is configured to adjust the baseline relationship by adjusting the slope.

19. The mirror assembly of claim 15, wherein the characteristic comprises a driver preference for an amount of reflectance of the mirror as reflected in the input from the driver.

* * * * *